United States Patent
Yamanaka et al.

(10) Patent No.: US 10,850,687 B2
(45) Date of Patent: Dec. 1, 2020

(54) VEHICLE-MOUNTING STRUCTURE FOR ELECTRONIC APPARATUS

(71) Applicants: TOYOTA JIDOSHA KABUSHIKI KAISHA, Toyota (JP); SUMITOMO WIRING SYSTEMS, LTD., Mie (JP)

(72) Inventors: Kenshi Yamanaka, Nukata-gun (JP); Shinichi Miura, Toyota (JP); Keisuke Sawazaki, Toyota (JP); Yasuhiro Kudo, Yokkaichi (JP); Kan Murai, Yokkaichi (JP)

(73) Assignees: TOYOTA JIDOSHA KABUSHIKI KAISHA, Toyota (JP); SUMITOMO WIRING SYSTEMS, LTD., Mie (JP)

(*) Notice: Subject to any disclaimer, the term of this patent is extended or adjusted under 35 U.S.C. 154(b) by 0 days.

(21) Appl. No.: 16/637,042

(22) PCT Filed: Jul. 11, 2018

(86) PCT No.: PCT/IB2018/000778
§ 371 (c)(1),
(2) Date: Feb. 6, 2020

(87) PCT Pub. No.: WO2019/034927
PCT Pub. Date: Feb. 21, 2019

(65) Prior Publication Data
US 2020/0238930 A1 Jul. 30, 2020

(30) Foreign Application Priority Data
Aug. 14, 2017 (JP) ................................ 2017-156411

(51) Int. Cl.
| | | |
|---|---|---|
| *B60R 16/023* | (2006.01) | |
| *H02B 1/46* | (2006.01) | |
| *H01R 13/6596* | (2011.01) | |

(52) U.S. Cl.
CPC ..... *B60R 16/0238* (2013.01); *H01R 13/6596* (2013.01); *H02B 1/46* (2013.01)

(58) Field of Classification Search
CPC ... B60R 16/0238; H02B 1/46; B60Y 2400/61; B60Y 2410/115; B60Y 1/00;
(Continued)

(56) References Cited

U.S. PATENT DOCUMENTS

| | | | | |
|---|---|---|---|---|
| 6,246,001 B1* | 6/2001 | Fukui | ................... | H01R 9/0512 174/78 |
| 6,437,245 B1* | 8/2002 | Hayashi | ............. | H01R 13/6215 174/74 R |

(Continued)

FOREIGN PATENT DOCUMENTS

| | | |
|---|---|---|
| JP | 2007-028785 A | 2/2007 |
| JP | 2015-115251 A | 6/2015 |
| JP | 2015-205596 A | 11/2015 |

*Primary Examiner* — Travis S Chambers
(74) *Attorney, Agent, or Firm* — Oliff PLC

(57) ABSTRACT

In a vehicle-mounting structure disclosed by the present specification, a housing (20) of an electric power controller (5) is supported above an in-vehicle transaxle via a bracket having an insulative vibration-proof material. The housing (20) and the transaxle are connected to each other by power cables (19). A braided wire (17) for grounding is routed along the power cables (19). A connector (10) of the power cables (19) has a resin flange (112) on a surface thereof that is joined to the housing (20). The connector (10) is fixed to the housing (20) by bolts (12a and 13a) that penetrate the flange (112). An end fitting (16) of the braided wire (17) is attached to the flange (112). The end fitting (16) and the bolt (13a) are electrically connected to each other by a conductive plate (14a).

2 Claims, 5 Drawing Sheets

(58) Field of Classification Search
CPC ........ H01R 4/302; H01R 4/30; H01R 9/0512;
H01R 12/596; H01R 13/6596; H01R
13/73; H01R 13/74; H01R 13/748
USPC ............... 439/76.2, 95–98, 108, 801; 174/51
See application file for complete search history.

(56) References Cited

U.S. PATENT DOCUMENTS

| | | | | |
|---|---|---|---|---|
| 6,669,511 | B1 * | 12/2003 | Yagi ....................... | H01R 4/646 |
| | | | | 439/607.44 |
| 6,783,377 | B2 * | 8/2004 | Aoyama ................ | H01R 11/12 |
| | | | | 439/92 |
| 7,210,947 | B1 * | 5/2007 | Fodero ............... | H01R 13/6596 |
| | | | | 439/607.41 |
| 9,666,994 | B2 * | 5/2017 | Hwang .................... | H01R 4/30 |
| 2002/0155738 | A1 * | 10/2002 | Ohsawa ........... | H01R 13/65912 |
| | | | | 439/98 |
| 2008/0242129 | A1 * | 10/2008 | Younce ................... | H01R 4/64 |
| | | | | 439/100 |
| 2015/0283955 | A1 | 10/2015 | Sakamoto et al. | |
| 2015/0303660 | A1 | 10/2015 | Sakamoto | |
| 2016/0301160 | A1 | 10/2016 | Nishida et al. | |

\* cited by examiner

VEHICLE-MOUNTING STRUCTURE FOR ELECTRONIC APPARATUS

BACKGROUND OF THE INVENTION

1. Field of the Invention

The art disclosed by the present specification relates to a vehicle-mounting structure for an electronic apparatus.

2. Description of Related Art

In general, a motor vehicle often utilizes its body as an electric ground for an in-vehicle electronic apparatus. Simply by fixing the electronic apparatus, which has a metal housing, to the body, the housing and the body are conducted with each other, so the potential of the housing can be held equal to a ground potential.

On the other hand, there is known an electronic apparatus that is supported on another in-vehicle device via a bracket having a vibration-proof material, with a view to protecting the electronic apparatus from vibrations of the vehicle. For example, in Japanese Patent Application Publication No. 2015-205596 (JP 2015-205596 A), there is disclosed an electric vehicle having an inverter that is supported above a motor case via a bracket. In order to muffle vibrations of the motor case, a housing of the inverter is fixed to a tip of the bracket via a vibration-proof bush. The vibration-proof bush is made of an insulative material. The housing of the inverter and the bracket (a body of the vehicle) are insulated from each other by the vibration-proof bush. In the electric vehicle of Japanese Patent Application Publication No. 2015-205596 (JP 2015-205596 A), a braided wire is arranged along the bracket. The braided wire is connected at one end thereof to the motor case, and is connected at the other end thereof to the housing of the inverter. The housing of the inverter is conducted with the motor case via the braided wire.

SUMMARY OF THE INVENTION

In the art of Japanese Patent Application Publication No. 2015-205596 (JP 2015-205596 A), the braided wire for grounding is routed along the bracket that supports the housing of the electronic apparatus (the inverter). The present specification provides an art of routing a braided wire for grounding along a cable that is connected to a housing of an electronic apparatus, as a new type of routing of the braided wire for grounding. In particular, the present specification provides a vehicle-mounting structure that is characterized in a mechanism for conducting the braided wire and the housing with each other in the case where a region of a connector of the cable that is in contact with the housing is made of resin.

In a vehicle-mounting structure disclosed by the present specification, a housing of an electronic apparatus is supported above another in-vehicle device via a bracket having an insulative vibration-proof material. The device and the housing are connected to each other by a cable. A braided wire for grounding is routed along the cable. A connector of the cable has a resin plate on a surface thereof that is joined to the housing. The connector is fixed to the housing by a bolt that penetrates the resin plate. An end fitting of the braided wire is attached to the resin plate. The end fitting and the bolt are electrically connected to each other by a conductive member.

In the aforementioned vehicle-mounting structure, the end fitting of the braided wire is attached to the resin plate. The end fitting (the braided wire) is conducted with the housing via the conductive member and the bolt (the bolt that fixes the connector to the housing). This structure makes it unnecessary to sandwich a metal component associated with the braided wire between a front surface of the resin plate (a surface thereof that faces the housing) and the housing. Therefore, the braided wire and the housing can be conducted with each other without deteriorating the sealing property between the housing and the resin plate.

The aforementioned conductive member may be embedded in the resin plate. There is no need for a component that fixes the conductive member to the resin plate, and the cost of the aforementioned structure can be reduced. The details of the art disclosed by the present specification and further improvements thereof will be described hereinafter.

BRIEF DESCRIPTION OF THE DRAWINGS

Features, advantages, and technical and industrial significance of an exemplary embodiment of the invention will be described below with reference to the accompanying drawings, in which like numerals denote like elements, and wherein.

DETAILED DESCRIPTION OF EMBODIMENT

A vehicle-mounting structure according to the embodiment of the invention will be described with reference to the drawings. The vehicle-mounting structure according to the embodiment of the invention is applied to an electric power controller that is mounted in a hybrid vehicle. This electric power controller is a device that converts a DC electric power of a battery into an AC electric power suited to drive a motor for running. The electric power controller is mounted in a front compartment (an engine compartment) of a hybrid vehicle 90.

Figure 1:
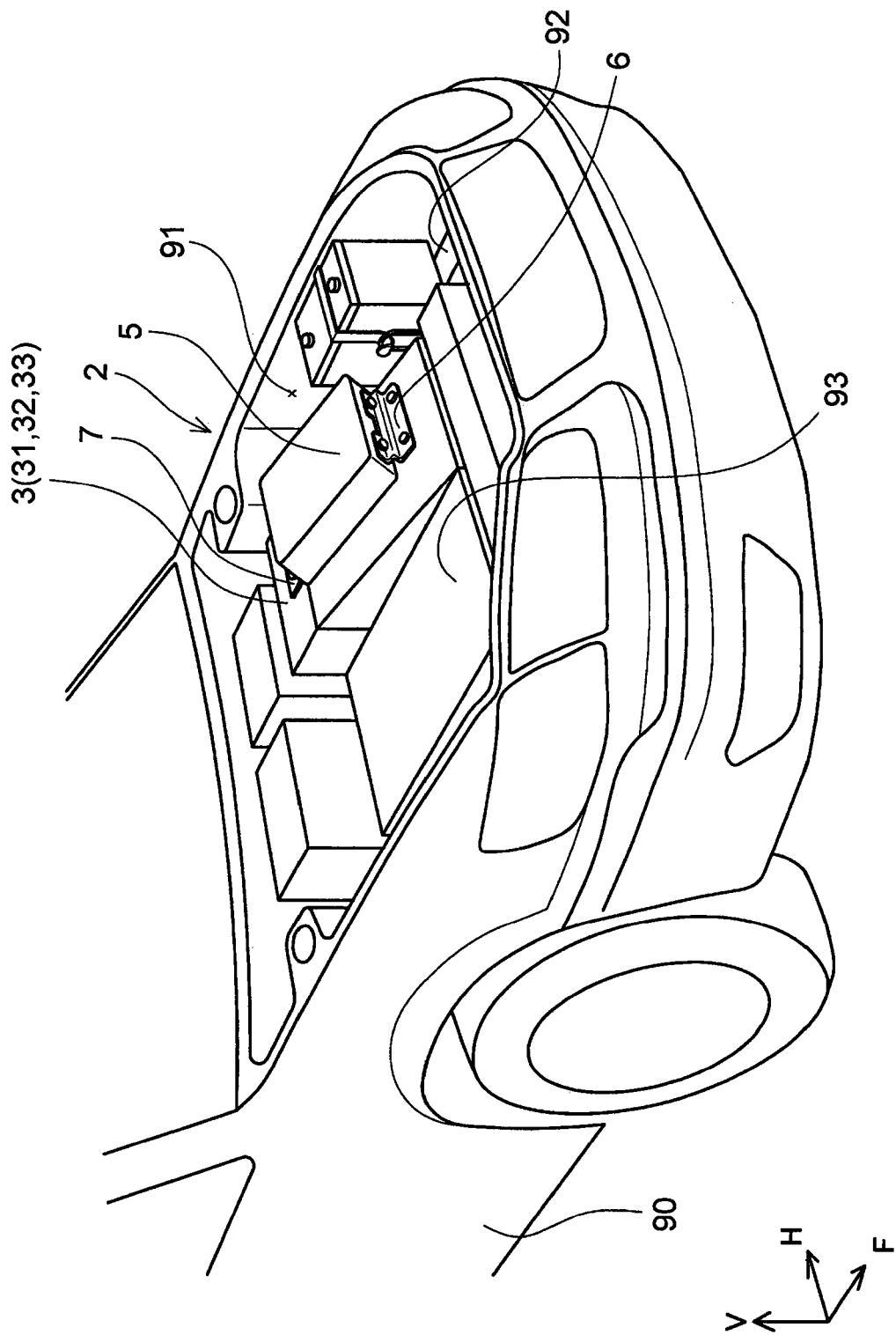
FIG. 1 is a perspective view showing the arrangement of an electric power controller to which a vehicle-mounting structure according to the embodiment of the invention is applied in a front compartment.

First of all, the arrangement of an electric power controller 5 in the front compartment of the hybrid vehicle 90 will be described. FIG. 1 is a perspective view showing a front compartment 91 of the hybrid vehicle 90. FIG. 1 is a perspective view showing the layout of devices in the front compartment 91. An engine 93, a transaxle 3, and the electric power controller 5 are mounted in the front compartment 91. Incidentally, other various devices are also mounted in the front compartment, but the depiction and description thereof will be omitted. In a coordinate system in the drawing, an F-axis represents a vehicle forward direction, a V-axis represents a vehicle vertical direction, and an H-axis represents a vehicle width direction. In FIG. 1, the engine 93, the transaxle 3, and the electric power controller 5 are schematically depicted. A vehicle-mounting structure 2 for the electric power controller 5 will be described hereinafter.

In the transaxle 3, two motors 31 and 32 for running, a differential gear 33, and a motive power distribution mechanism are accommodated. The transaxle 3 and the engine 93 are coupled to each other, and an output shaft of the engine 93 is coupled to the motive power distribution mechanism. Output shafts of the two motors 31 and 32 are also coupled to the motive power distribution mechanism. The motive power distribution mechanism appropriately synthesizes an output torque of the engine 93 with output torques of the two motors 31 and 32 and outputs a synthetic torque. The synthetic torque is transmitted to wheels via a differential gear. Besides, the motive power distribution mechanism distributes the output torque of the engine 93 to the motor 31 and the wheels in some cases. In such cases, the hybrid vehicle 90 generates electric power by the motor 31, while running by a driving force of the engine 93. The motors 31 and 32 for running are accommodated in the transaxle 3, so a housing of the transaxle 3 can also be referred to as a motor housing.

The engine 93 and the transaxle 3 are coupled to each other in the vehicle width direction, and are suspended between two side members 92 of the vehicle. Incidentally, in FIG. 1, one of the two side members 92 is in a dead zone and invisible.

The electric power controller 5 is fixed on the transaxle 3. The electric power controller 5 is fixed above the transaxle 3 by a front bracket 6 and a rear bracket 7. The electric power controller 5 is a device that converts a DC electric power of a main battery (not shown) into an electric power for driving the motors 31 and 32. The electric power controller 5 also has a function of converting a regenerative AC electric power generated by the motor 31 into a DC electric power. The regenerative electric power converted into the DC electric power is used to charge the battery.

Figure 2:
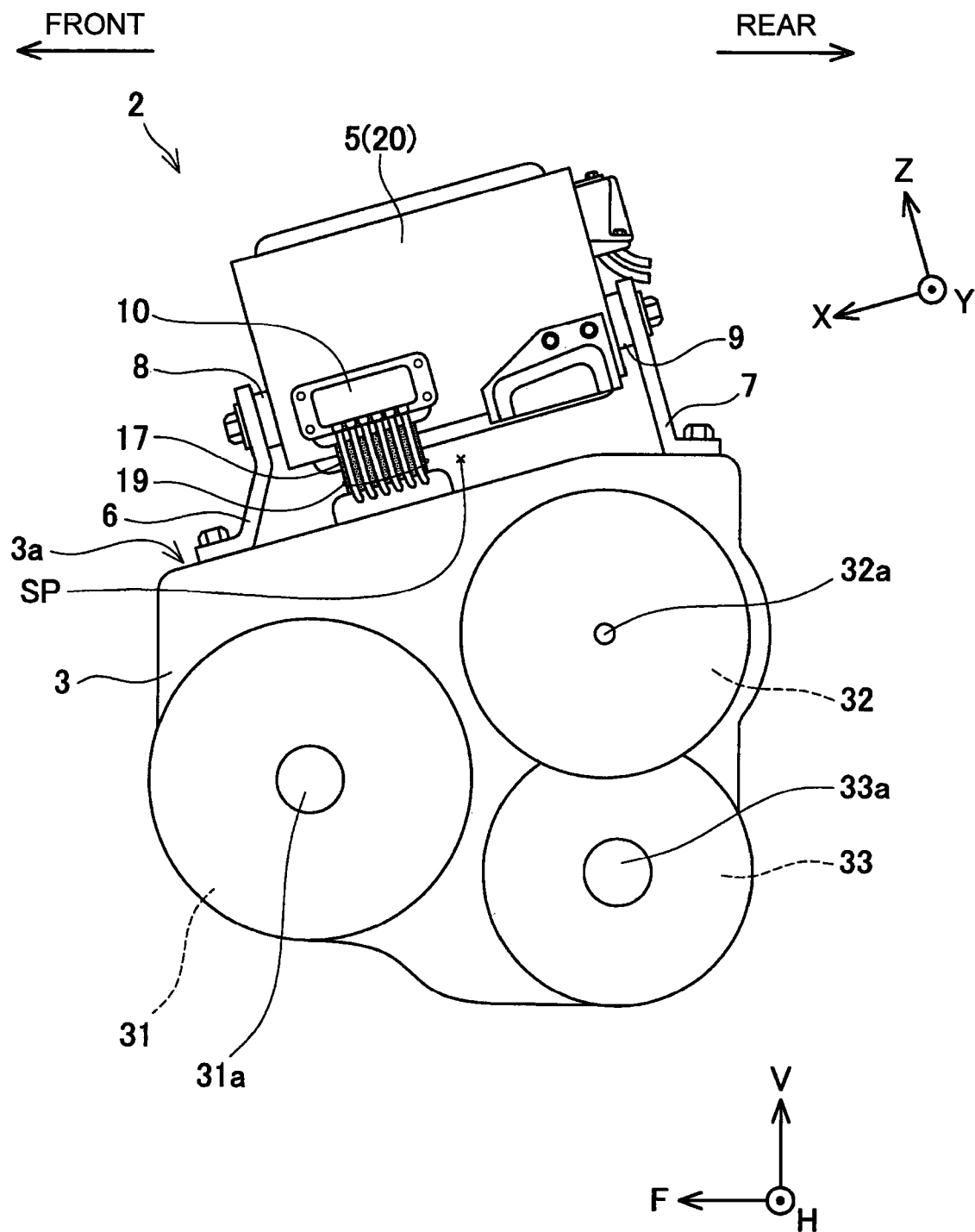
FIG. 2 is a lateral view of the electric power controller that is supported on a transaxle.

FIG. 2 is a lateral view showing the transaxle 3 and the electric power controller 5 fixed thereon. Incidentally, an XYZ coordinate system shown in FIG. 2 consists of an X-axis extending parallel to a bottom surface of the electric power controller 5, a Y-axis extending in the vehicle width direction, and a Z-axis extending perpendicularly to the X-axis and the Y-axis. This coordinate system is added to partial views and cross-sectional views of the electric power controller 5 in FIGS. 3 to 7, with a view to facilitating the understanding of the orientation of the electric power controller 5.

As described previously, the two motors 31 and 32, the differential gear 33, and the motive power distribution mechanism are accommodated in the transaxle 3. Output shafts 31a and 32a of the two motors 31 and 32 and a shaft 33a of the differential gear 33 extend parallel to the vehicle width direction. As shown in FIG. 2, the three shafts 31a, 32a, and 33a are arranged in such a manner as to form a triangle as viewed in the vehicle width direction. Due to this arrangement of the motors 31 and 32 and the differential gear 33, an upper surface 3a of the transaxle 3 assumes a front-lowered shape. The electric power controller 5 is fixed above the front-lowered upper surface 3a. The electric power controller 5 is also fixed in a front-lowered posture. Six power cables 19 extend from a lateral surface of the electric power controller 5, and are connected to the transaxle 3. The six power cables 19 transfer two three-phase AC electric powers to be supplied to the two motors 31 and 32 respectively. In order to reduce the loss of electric power in the power cables 19 that transfer large electric power, the electric power controller 5 is arranged close to the motors 31 and 32, namely, in an upper portion of the transaxle 3 that accommodates the motors. By arranging the electric power controller 5 close to the motors 31 and 32, the power cables 19 are made short, and the loss of electric power is reduced. The connector 10 is connected to one end of each of the power cables 19. The connector 10 is connected to the lateral surface of the electric power controller 5. A braided wire 17 extends along the power cables 19. The braided wire 17 is electrically connected at one end thereof to a housing 20 of the electric power controller 5 via the connector 10, and is electrically connected at the other end thereof to the housing of the transaxle 3. The braided wire 17 will be described later.

The electric power controller 5 is fixed with a gap SP created between the electric power controller 5 and the transaxle 3, by the front bracket 6 and the rear bracket 7. The brackets 6 and 7 are adopted to protect the electric power controller 5 from vibrations of the transaxle 3 (vibrations of the motors 31 and 32) and vibrations of the engine 93. Incidentally, a vibration-proof bush 8 is sandwiched between the housing 20 of the electric power controller 5 and an upper end of the front bracket 6, and a vibration-proof bush 9 is sandwiched between the housing 20 and an upper end of the rear bracket 7. The vibration-proof bushes 8 and 9 are insulative. Therefore, the housing 20 is not conducted via the front bracket 6 and the rear bracket 7. As will be described later in detail, the housing 20 is conducted with the housing of the transaxle 3 via the braided wire 17.

The hybrid vehicle 90 has a body that is utilized as a ground terminal of in-vehicle apparatuses. The housing of the transaxle 3, which is suspended from the side members 92 (see FIG. 1), is also conducted with the body, and is held at a ground potential. The housing 20 of the electric power controller 5 is also desired to be conducted with the transaxle 3 and held at the ground potential. It should be noted, however, that since the front bracket 6 and the rear bracket 7 are coupled to the housing 20 via the insulative vibration-proof bushes 8 and 9 respectively as described previously, the housing 20 and the transaxle 3 need to be connected to each other by a special conductor. The housing 20 of the electric power controller 5 is conducted with the transaxle 3 via the conductive braided wire 17. Next, the routing of the braided wire 17 will be described.

Figure 3:
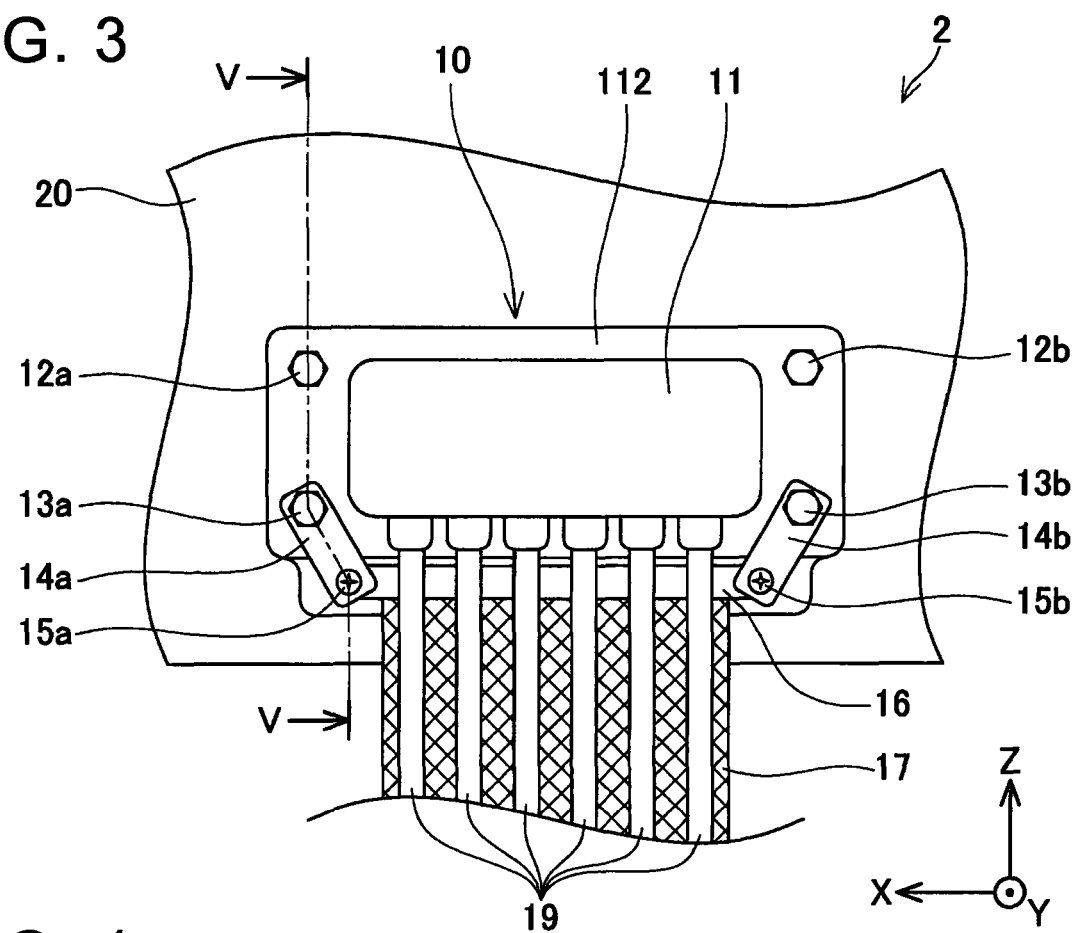
FIG. 3 is a front view of a connector that is attached to the electric power controller.
Figure 4:
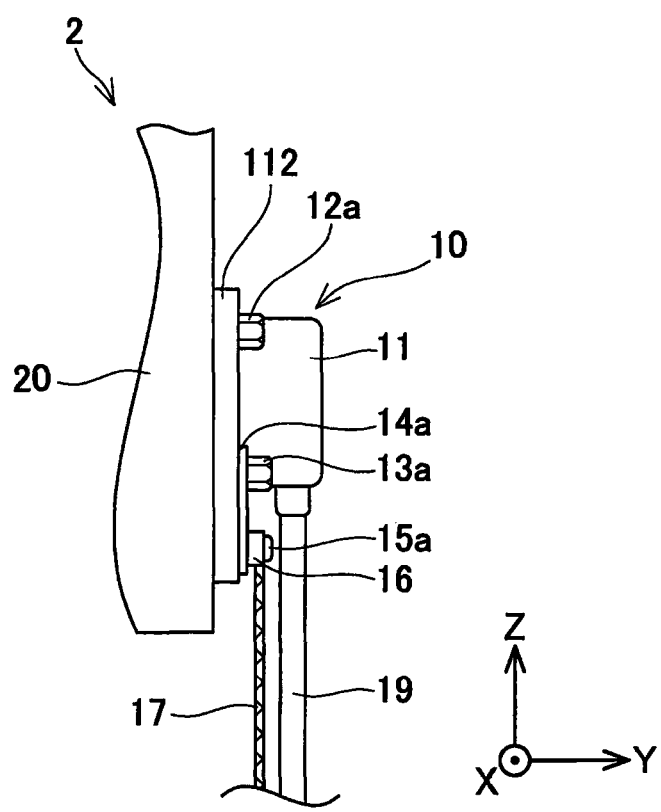
FIG. 4 is a lateral view of the connector that is attached to the electric power controller.
Figure 5:
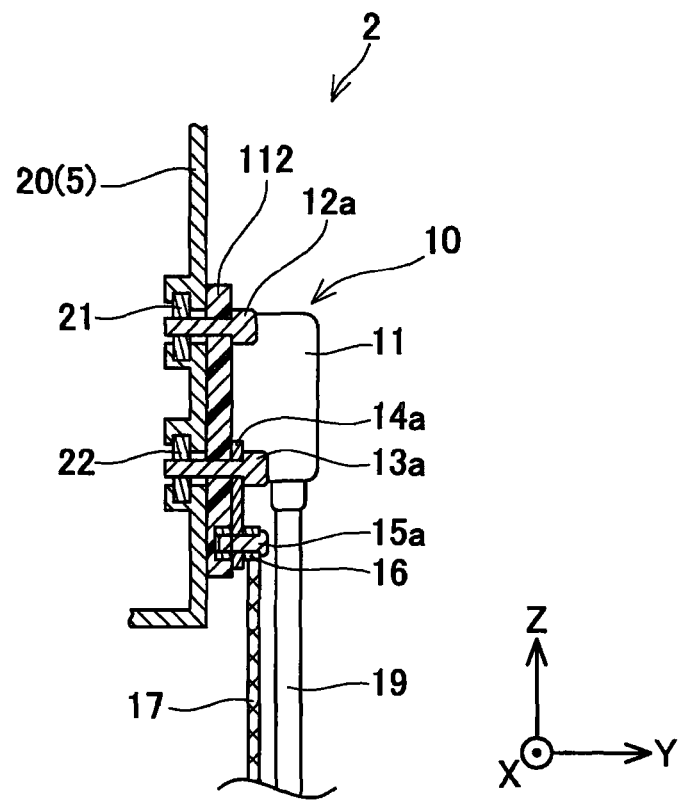
FIG. 5 is a cross-sectional view along a line V-V of FIG. 3.
Figure 6:
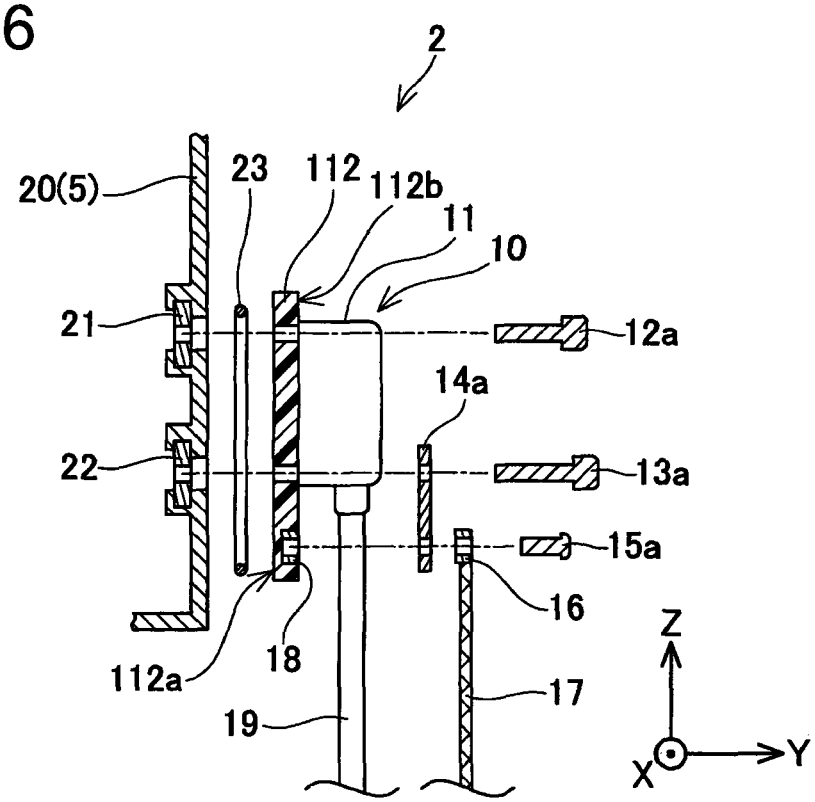
FIG. 6 is an exploded view corresponding to FIG. 5.

FIG. 3 is a front view showing the connector 10 that is attached to the housing 20 of the electric power controller 5. FIG. 4 is a lateral view showing the connector 10. FIG. 5 is a cross-sectional view along a line V-V in FIG. 3. FIG. 6 is an exploded view corresponding to FIG. 5.

A connector housing 11 equivalent to a body of the connector 10 is made of insulative resin. The six power cables 19 lead to an interior of the connector housing 11 from a lower surface thereof. Each of the power cables is coupled to a corresponding terminal on the electric power controller 5 side, inside the connector housing 11. The connector housing 11 is equipped with a flange 112 on a side thereof that faces the housing 20 of the electric power controller 5. The flange 112 is also made of resin, and is insulative. One surface of the flange 112 is in contact with the housing 20. Bolts 12a, 12b, 13a, and 13b penetrate the flange 112. The flange 112 (the connector 10) is fixed to the housing 20 by the bolts 12a, 12b, 13a, and 13b.

The braided wire 17 is routed along the power cables 19. An end fitting 16 is connected to one end of the braided wire 17. The braided wire 17 has the same connection structure on the right and left sides of FIG. 3. The connection structure of the braided wire 17 on the left side of FIG. 3 will be described hereinafter. As shown in FIG. 6, a metal nut 18 is embedded in a surface of the flange 112 on the other side of the housing 20. The end fitting 16 is fixed to the nut 18 (i.e., the flange 112) by a screw 15a. The end fitting 16 is fixed to a surface of the flange 112 that does not face the housing 20. The one of the two surfaces of the flange 112 that faces the housing 20 will be referred to hereinafter as "a flange front surface 112a", and the other surface of the flange 112 that is located on the other side will be referred to hereinafter as "a flange back surface 112b".

A conduction plate 14a is fixed, together with the end fitting 16, by the screw 15a on the flange back surface 112b side. In other words, the end fitting 16 and the conduction plate 14a are fastened together. By being fastened together, the end fitting 16 and the conduction plate 14a are conducted with each other.

The flange 112 is fixed to the housing 20 by the bolts 12a and 13a. A through-hole is provided through the flange 112. The bolts 12a and 13a pass through the through-hole, and tips thereof are fixed to the housing 20. A nut 21 is embedded in the housing 20 at a position corresponding to the bolt 12a, and the bolt 12a is screwed to the nut 21. A nut 22 is embedded in the housing 20 at a position corresponding to the bolt 13a, and the bolt 13a is screwed to the nut 22. The aforementioned conduction plate 14a is fastened together with the bolt 13a, on the flange back surface 112b side. By being fastened together, the bolt 13a and the conduction plate 14a are conducted with each other.

The bolt 13a is connected to the conductive nut 22, inside the housing 20. Therefore, the end fitting 16 (i.e., the braided wire 17) is conducted with the housing 20 via the conduction plate 14a and the bolt 13a. The same is true of the connection structure of the end fitting 16 on the right side of FIG. 3. The end fitting 16 is conducted with the housing 20 via the conduction plate 14b and the bolt 13b.

Advantages of the above-mentioned vehicle-mounting structure 2 will be described. The housing 20 of the electric power controller 5 is supported above the transaxle 3 via the front bracket 6 and the rear bracket 7. The front bracket 6 and the rear bracket 7 support the housing 20 via the insulative vibration-proof bushes 8 and 9 respectively. Therefore, the housing 20 is not conducted with the transaxle 3 via the front bracket 6 and the rear bracket 7. The housing 20 is conducted with the transaxle 3 via the braided wire 17. The end fitting 16 is connected to one end of the braided wire 17, and the end fitting 16 is fixed to the insulative flange 112 of the connector housing 11. The end fitting 16 is fixed to the flange back surface 112b (the surface of the flange 112 that does not face the housing 20). The end fitting 16 is fastened together with and conducted with the conduction plate 14a (14b), on the flange back surface 112b side. The other end of the conduction plate 14a (14b) is fixed to the flange 112 while being in contact with the bolt 13a (13b) on the flange back surface 112b side. The tip of the bolt 13a (13b) is in contact with the housing 20. As a result, the end fitting 16 (the braided wire 17) is conducted with the housing 20. The end fitting 16 is conducted with the bolt 13a (13b) via the conduction plate 14a (14b) on the flange back surface 112b side. A conduction route of the end fitting 16 to the bolt 13a (13b) is entirely located on the flange back surface 112b side. The end fitting 16 has no influence on the flange front surface 112a side. As shown in FIG. 6, a space between the housing 20 and the flange 112 is sealed by an O-ring 23. When metal members such as the end fitting 16, the conductive plates 14a and 14b and the like are stuck between the flange front surface 112a of the flange 112 and the housing 20, the sealing property of the flange front surface 112a may be deteriorated. In the above-mentioned vehicle-mounting structure 2, the end fitting 16 of the braided wire 17 and the conduction plate 14a (14b), which aim at conduction between the housing 20 and the transaxle 3, are arranged on the flange back surface 112b side, and hence do not deteriorate the sealing property between the flange front surface 112a and the housing 20.

Figure 7:
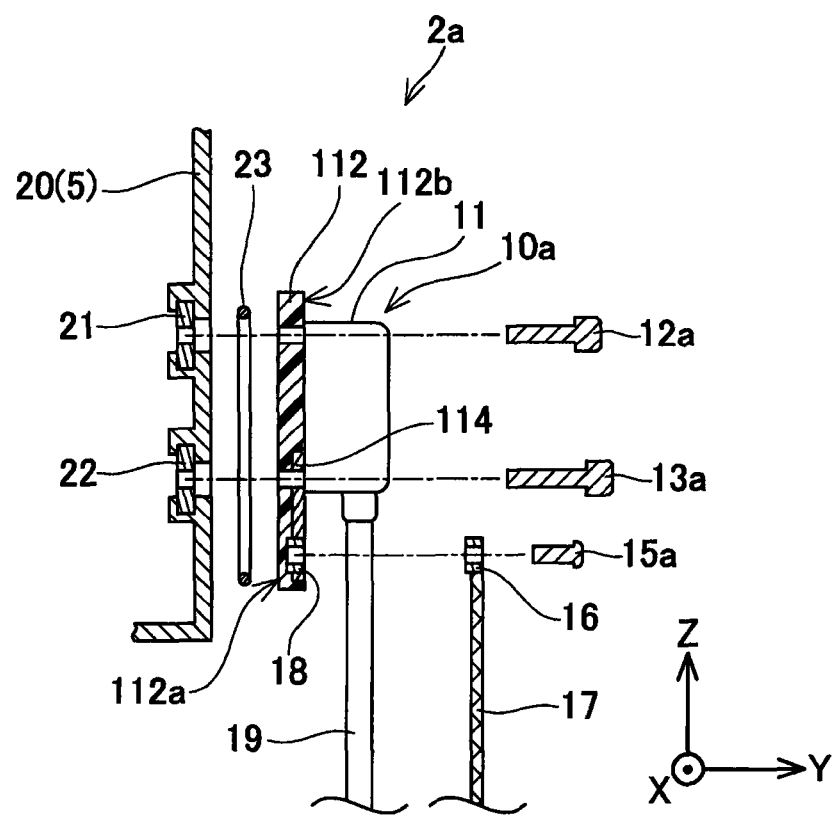
FIG. 7 is an exploded cross-sectional view of a connector housing according to a modification example.

Next, a connector housing according to a modification example (a vehicle-mounting structure 2a according to the modification example) will be described with reference to FIG. 7. FIG. 7 is an exploded cross-sectional view of a connector 10a. FIG. 7 corresponds to FIG. 6. In this modification example, the conduction plate 114 that conducts the end fitting 16 and the bolt 13a with each other is embedded in the resin flange 112, with one surface of the conduction plate 114 exposed to the flange back surface 112b. The conduction plate 114 is also in contact with the nut 18 inside the resin flange 112. When the end fitting 16 is fixed to the flange 112 (the nut 18) by the screw 15a, the conduction plate 114 and the end fitting 16 are fastened together and conducted with each other. This holds true of the case of the foregoing vehicle-mounting structure 2.

In the vehicle-mounting structure 2a, the conduction plate 114 is embedded in the resin flange 112. Therefore, there is no need for a component that attaches the conduction plate 114 to the flange 112, and the cost is reduced.

A point to remember about the art described in the embodiment of the invention will be described. The flange 112 in the embodiment of the invention is equivalent to an example of the resin plate that abuts on the housing 20.

The vehicle-mounting structure disclosed by the present specification may be applied to an electronic apparatus other than the electric power controller. Besides, the device to which the electronic apparatus to which the vehicle-mounting structure disclosed by the present specification is applied is fixed may not necessarily be the transaxle. For example, the vehicle-mounting structure disclosed by the present specification may be applied to a device that is supported above the engine with a gap by a bracket.

Although the concrete examples of the invention have been described above in detail, these are nothing but exemplifications and do not limit the claims. The art set forth in the claims encompasses various modifications and alterations of the concrete examples exemplified above. The technical elements described in the present specification or the drawings are technically useful either alone or in various combinations, and should not be limited to the combinations set forth in the claims at the time of the filing of the application. Besides, the art exemplified in the present specification or the drawings can simultaneously achieve a plurality of objects, and is technically useful through the achievement of one of the objects alone.

The invention claimed is:

1. A vehicle-mounting structure for an electronic apparatus, comprising:
   a metal housing, wherein
   the housing is supported above another in-vehicle device via a bracket having an insulative vibration-proof material,
   the device and the housing are connected to each other by a cable,
   a braided wire for grounding is routed along the cable,
   a connector of the cable has a resin plate on a surface thereof that is joined to the housing,
   the connector is fixed to the housing by a bolt that penetrates the resin plate, an end fitting of the braided wire is attached to the resin plate, and the end fitting and the bolt are electrically connected to each other by a conductive member.

2. The vehicle-mounting structure according to claim 1, wherein the conductive member is embedded in the resin plate.

* * * * *